(12) United States Patent
Lehr et al.

(10) Patent No.: US 7,996,365 B2
(45) Date of Patent: Aug. 9, 2011

(54) RECORD LEVEL FUZZY BACKUP

(75) Inventors: Douglas Lee Lehr, Tucson, AZ (US); Franklin Emmert McCune, Tucson, AZ (US); David Charles Reed, Tuson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 12/168,694

(22) Filed: Jul. 7, 2008

(65) Prior Publication Data

US 2010/0005126 A1  Jan. 7, 2010

(51) Int. Cl.
*G06F 7/00* (2006.01)
*G06F 17/00* (2006.01)

(52) U.S. Cl. ...................................... 707/640
(58) Field of Classification Search ................... 707/640
See application file for complete search history.

(56) References Cited

U.S. PATENT DOCUMENTS

| | | | |
|---|---|---|---|
| 5,943,495 A * | 8/1999 | McLain, Jr. | 708/9 |
| 6,385,707 B1 * | 5/2002 | Maffezzoni | 711/162 |
| 6,772,303 B2 | 8/2004 | Crockett et al. | |
| 6,782,399 B2 | 8/2004 | Mosher, Jr. | |
| 6,785,786 B1 * | 8/2004 | Gold et al. | 711/162 |
| 7,043,504 B1 | 5/2006 | Moore et al. | |
| 2004/0260726 A1 | 12/2004 | Hrle et al. | |
| 2005/0198456 A1 | 9/2005 | Watanabe et al. | |
| 2006/0004879 A1 | 1/2006 | Tone | |
| 2006/0218203 A1 | 9/2006 | Yamato et al. | |
| 2008/0059736 A1 | 3/2008 | Murayama et al. | |

* cited by examiner

*Primary Examiner* — Greta L Robinson
*Assistant Examiner* — Jeffrey Chang
(74) *Attorney, Agent, or Firm* — Griffiths & Seaton PLLC

(57) ABSTRACT

A method, system, and computer program product for performing a backup operation in a computing environment is provided. A list of keys identifying a plurality of locked records is created at a start of the backup operation. If a first locked record of the plurality of locked records is obtained during the backup operation, a first key identifying the first locked record is added to the list of keys. At a completion of the backup operation, if a second locked record of the plurality of locked records was not moved during the backup operation, a second key identifying the second locked record from the list of keys is dropped. The list of keys is written to a log file as in-flight updates. The in-flight updates are reprocessed through the backup operation using the log file.

20 Claims, 2 Drawing Sheets

RECORD LEVEL FUZZY BACKUP

BACKGROUND OF THE INVENTION

1. Field of the Invention

The present invention relates in general to computers, and more particularly to apparatus, method and computer program product embodiments for implementing a record level fuzzy backup mechanism in a computing environment.

2. Description of the Related Art

Computers and computer systems are found in a variety of settings in today's society. Computing environments and networks may be found at home, at work, at school, in government, and in other settings. In many computer systems, an operating system (OS) helps to share computer resources (processor, memory, disk space, network bandwidth, etc.) between users and application programs. Operating systems may also control access to the computer system in a security-related function.

Generally, computing environments known as servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle. Operating systems may be used, along with storage-specific applications, to facilitate the data storage.

SUMMARY OF THE INVENTION

Customers today create multiple copies of their data for backup/disaster recovery purposes. In many cases, these backups are made from the primary version of the dataset on a direct access storage device (DASD) such as a hard disk drive (HDD) or a redundant array of independent disks (RAID). When taking a backup of a file, customers are not always able to quiesce the application using the file or close the file during the backup window. As a result, the customer takes the backup while the dataset is changing. This is referred to as a "fuzzy backup," because the backup is not consistent for a given time period due to pending updates.

Fuzzy backups may result in the backup copy being unusable because of data inconsistencies. Although the backup process may have seemed successful, the resultant copies of the files (or directories) may be useless because a restore would yield inconsistent and unusable data.

In light of the foregoing, a need exists for a mechanism to allow for greater consistency and reliability when fuzzy backups are made. Accordingly, this mechanism would reduce the amount of data inconsistency, providing a much less "fuzzy" backup as a result.

In one embodiment, by way of example only, a method for performing a backup operation in a computing environment is provided. A list of keys identifying a plurality of locked records is created at a start of the backup operation. If a first locked record of the plurality of locked records is obtained during the backup operation, a first key identifying the first locked record is added to the list of keys. At a completion of the backup operation, if a second locked record of the plurality of locked records was not moved during the backup operation, a second key identifying the second locked record from the list of keys is dropped. The list of keys is written to a log file as in-flight updates. The in-flight updates are reprocessed through the backup operation using the log file.

In another embodiment, again by way of example only, a system for performing a backup operation in a computing environment is provided. A backup module is operable on the computing environment. The backup module is adapted for creating a list of keys identifying a plurality of locked records at a start of the backup operation, if a first locked record of the plurality of locked records is obtained during the backup operation, adding a first key identifying the first locked record to the list of keys, at a completion of the backup operation, if a second locked record of the plurality of locked records was not moved during the backup operation, dropping a second key identifying the second locked record from the list of keys, writing the list of keys to a log file as in-flight updates, and reprocessing the in-flight updates through the backup operation using the log file.

In still another embodiment, again by way of example only, a computer program product for performing a backup operation in a computing environment is provided. The computer program product comprises a computer-readable storage medium having computer-readable program code portions stored therein. The computer-readable program code portions include a first executable portion for creating a list of keys identifying a plurality of locked records at a start of the backup operation, a second executable portion for, if a first locked record of the plurality of locked records is obtained during the backup operation, adding a first key identifying the first locked record to the list of keys, a third executable portion for, at a completion of the backup operation, if a second locked record of the plurality of locked records was not moved during the backup operation, dropping a second key identifying the second locked record from the list of keys, a fourth executable portion for writing the list of keys to a log file as in-flight updates, and a fifth executable portion for reprocessing the in-flight updates through the backup operation using the log file.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for performing an enhanced backup operation in a computing environment. The enhanced operation reduces and/or eliminates data inconsistencies resulting from fuzzy backups. Exemplary embodiments include the use of a list of keys identifying the records locked during a backup operation (thereby becoming suspect).

When a backup operation begins, this list of keys for locked records may be created. Again, the list of keys identifies/represents the list of records that may change during the backup window. Any new locked records that are obtained while the backup is taking place may be added to the list of keys. If a portion of the dataset being backed up has not yet been moved before the lock is released, then this portion (and corresponding records) may be dropped (i.e., the keys may be removed from the list), since it is known that the updated completed before that location of the dataset was moved.

Thus, the list of keys only contains keys for portions of the dataset that changes did not complete, or were initiated after that portion of the dataset was dumped. When the backup operation completes, the list indicates what records were "in flight" during the backup. These records may be written to a log file. The log file may be an existing application log. For application without a log, a log file may be created. If the file needs to be restored, these in-flight updates are reprocessed using the log file.

Once the reprocessing is complete, the suspect portion of the dataset is consistent for a time coincident with the earlier backup operation's completion. For applications without a log, the newly created log file contains a list of keys (identifying records) that may have changed during the backup window. A user may then take an appropriate action to verify that the suspect portion of the dataset actually contains the data they expect to be at that location. Such a mechanism represents an improvement over current methodologies, where the user is unaware of what records were updated.

Figure 1:
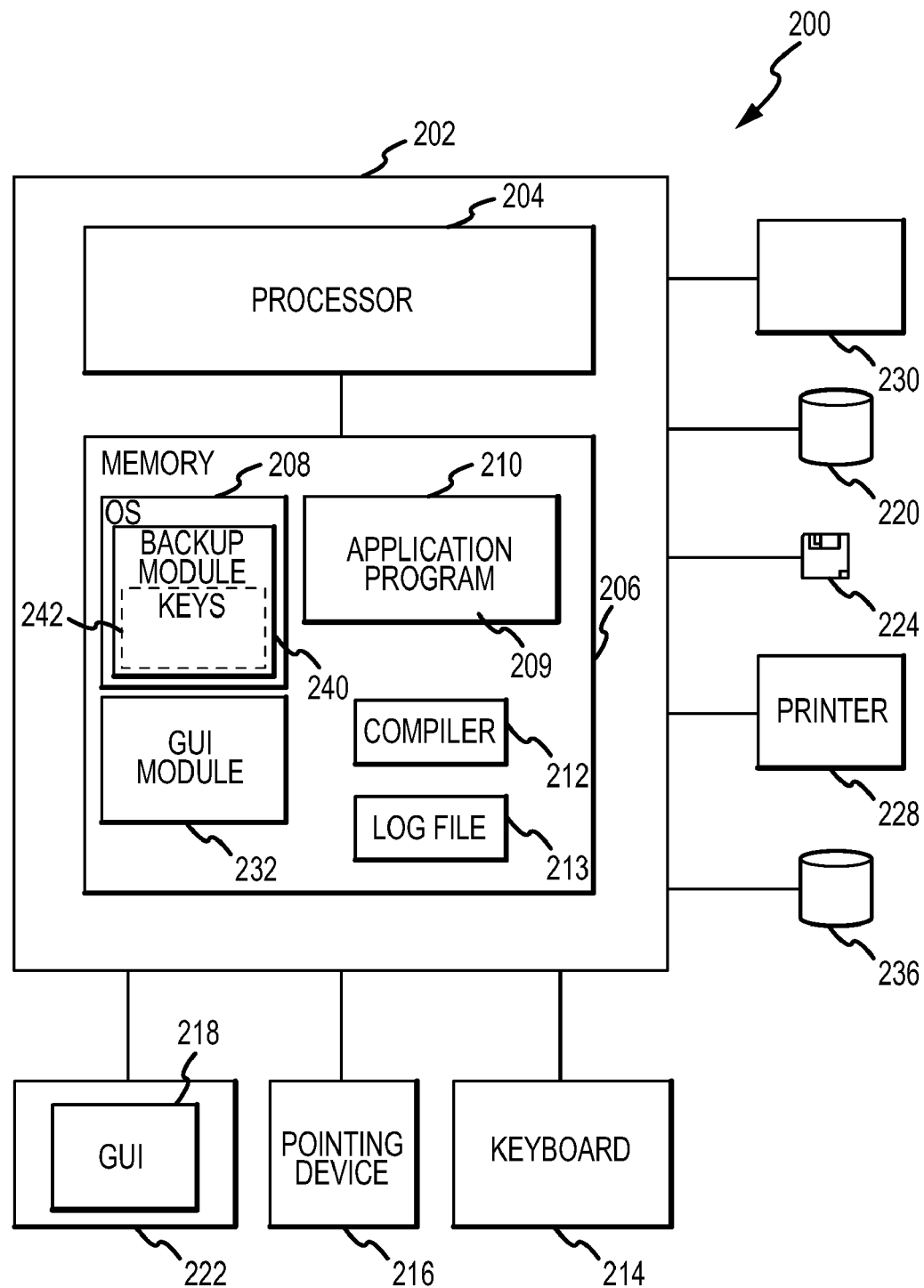
FIG. 1 illustrates an exemplary computing environment in which aspects of the present invention may be implemented.

FIG. 1 hereafter provides an example of computer environment in which the mechanisms of the following embodiments may be implemented. It should be appreciated, however, that FIG. 1 is only exemplary and is not intended to state or imply any limitation as to the particular architectures in which the exemplary aspects of the various embodiments may be implemented. Many modifications to the architecture depicted in FIG. 1 may be made without departing from the scope and spirit of the following description and claimed subject matter.

FIG. 1 illustrates an exemplary computer environment 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the backup mechanisms are facilitated by the OS 208. Although the GUI module 232 is depicted as a separate module, the instructions performing the GUI functions can be resident or distributed in the operating system 208, the computer program 210, or implemented with special purpose memory and processors. The computer 202 also implements a compiler 212 that allows an application program 210 written in a programming language such as COBOL, PL/1, C, C++, JAVA, ADA, BASIC, VISUAL BASIC or any other programming language to be translated into code that is readable by the processor 204.

After completion, the computer program 210 accesses and manipulates data stored in the memory 206 of the computer 202 using the relationships and logic that was generated using the compiler 212. A log file 213 is associated with the application program 210. The functionality of the log file 213 will be further described, following. The computer 202 also optionally comprises an external data communication device 230 such as a modem, satellite link, Ethernet card, wireless link or other device for communicating with other computers, e.g. via the Internet or other network.

Data storage device 220 is a direct access storage device (DASD) 220, including one or more primary volumes holding a number of datasets. DASD 220 may include a number of storage media, such as hard disk drives (HDDs), tapes, and the like. Data storage device 236 may also include a number of storage media in similar fashion to device 220. The device 236 may be designated as a backup device 236 for holding backup versions of the number of datasets primarily stored on the device 220. As the skilled artisan will appreciate, devices 220 and 236 need not be located on the same machine. Devices 220 may be located in geographically different regions, and connected by a network link such as Ethernet. Devices 220 and 236 may include one or more volumes, with a corresponding volume table of contents (VTOC) for each volume.

In one embodiment, instructions implementing the operating system 208, the computer program 210, and the compiler 212 are tangibly embodied in a computer-readable medium, e.g., data storage device 220, which may include one or more fixed or removable data storage devices, such as a zip drive, disc 224, hard drive, DVD/CD-ROM, digital tape, etc., which are generically represented as the disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for managing a distributed computer system comprising a network of computing devices, such as a storage area network (SAN). The program 210 may operate within a single computer 202 or as part of a distributed computer system comprising a network of computing devices. The network may encompass one or more computers connected via a local area network and/or Internet connection (which may be public or secure, e.g. through a VPN connection), or via a fibre channel Storage Area Network or other known network types as will be understood by those skilled in the art. (Note that a fibre channel SAN is typically used only for computers to communicate with storage systems, and not with each other.)

Operating system 208 includes a backup module 240. The backup module may operate in conjunction with program(s) 210, and other components within the computer environment 200, to implement backup operations on the environment 200. In one embodiment, the backup module 240 is adapted to perform various methodologies that will be further described, such as creating a list of keys 242 identifying locked records in a backup window, as will be further described. As one skilled in the art will appreciate, however, various additional components of the environment 200 may work individually or in concert to define, initialize, and perform the backup functionality as will be further described.

In general, and in accordance with the present invention, backup operations may be enhanced with various changes. The changes may be implemented automatically without the necessity of user interaction with the environment 200. The changes will be described in additional detail. In general, however, the changes may include creating a list of keys 242 identifying locked records of a particular dataset, adding new keys 242 for each additional locked record, dropping keys 242 for records not moved during the backup window, writing the list of keys to the log file 213 as in-flight updates, and reprocessing the in-flight updates through an additional backup operation.

Figure 2:
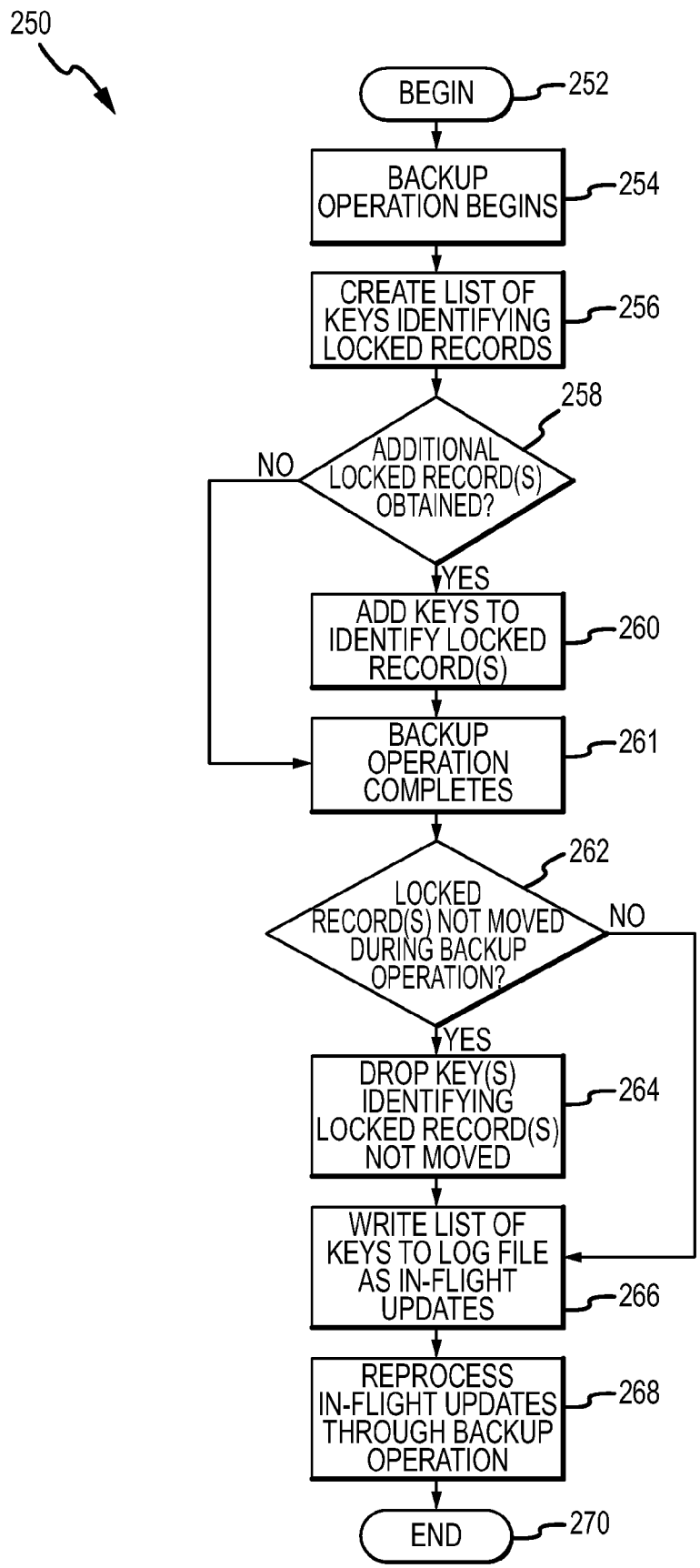
FIG. 2 illustrates an exemplary method for performing a backup operation in a computing environment.

Turning to FIG. 2, an exemplary method 250 is depicted for performing a backup operation using the mechanisms of the present invention in a computing environment. As one skilled in the art will appreciate, various steps in the method 250 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 250 begins (step 252) with the start of a backup operation (step 254) opening the backup window. Method 250 tracks record-by-record through the backup window. Once the backup operation commences, a list of keys for locked records is created (step 256). Again, such a list represents a list of records that may change during the backup window.

If additional locked records are obtained during the backup window (step 258), new keys representing the additional records are added to the list (step 260). The backup operation completes (the backup window closes) (step 261). For those locked records not moved during the backup window (step 262), the keys identifying the locked records are dropped from the list (step 264).

Once the keys identifying unchanged records are removed from the list, the remaining list of keys are written to the log file as in-flight updates (step 266). The in-flight updates are reprocessed through the backup operation to ensure data consistency (step 268). The user may perform later verification of such records. The method 250 then ends (step 270).

While method 250 describes one exemplary methodology, the skilled artisan will appreciate that variations to the depicted methodology may be performed. For example, a two-pass logic may be employed in the backup operation, in which a first pass would process all datasets. The same list of keys may be created as described above. A second pass processes those datasets that have become unlocked with the first pass completes. The second pass unlocked records then overwrite the updated first pass locked records on the backup dataset. As a result, a smaller list of keys would be created, or the list of keys would be eliminated.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for performing a backup operation in a computing environment, comprising:
   creating a list of keys identifying a plurality of locked records at a start of the backup operation;
   if a first locked record of the plurality of locked records is obtained during the backup operation, adding a first key identifying the first locked record to the list of keys;
   at a completion of the backup operation, if a second locked record of the plurality of locked records was not moved during the backup operation, dropping a second key identifying the second locked record from the list of keys;
   writing the list of keys to a log file as in-flight updates; and
   reprocessing the in-flight updates through the backup operation using the log file.

2. The method of claim 1, wherein reprocessing the in-flight updates through the backup operation includes processing a group of the plurality of locked records that have become unlocked subsequent to the completion of the backup operation.

3. The method of claim 1, wherein reprocessing the in-flight updates only occurs pursuant to a file restoration determination.

4. The method of claim 2, wherein the file restoration determination is made by a user.

5. The method of claim 1, wherein writing the list of keys to a log file includes writing the list of keys to an existing applications log.

6. The method of claim 1, further including creating the log file.

7. The method of claim 1, further including verifying a portion of a data set corresponding to the in-flight updates.

8. A system for performing a backup operation in a computing environment, comprising:

a processor device, operable on the computing environment, wherein the processor device is adapted for:

creating a list of keys identifying a plurality of locked records at a start of the backup operation, if a first locked record of the plurality of locked records is obtained during the backup operation, adding a first key identifying the first locked record to the list of keys, at a completion of the backup operation, if a second locked record of the plurality of locked records was not moved during the backup operation, dropping a second key identifying the second locked record from the list of keys, writing the list of keys to a log file as in-flight updates, and reprocessing the in-flight updates through the backup operation using the log file.

9. The system of claim 8, wherein the backup module is further adapted for processing a group of the plurality of locked records that have become unlocked subsequent to the completion of the backup operation.

10. The system of claim 8, wherein reprocessing the in-flight updates only occurs pursuant to a file restoration determination.

11. The system of claim 10, wherein the file restoration determination is made by a user.

12. The system of claim 8, wherein the backup module is further adapted for writing the list of keys to an existing applications log.

13. The system of claim 8, wherein the backup module is further adapted for creating the log file.

14. The system of claim 8, wherein the backup module is further adapted for verifying a portion of a data set corresponding to the in-flight updates.

15. A computer program product for performing a backup operation in a computing environment, the computer program product comprising a computer-readable storage medium having computer-readable program code portions stored therein, the computer-readable program code portions comprising:

a first executable portion for creating a list of keys identifying a plurality of locked records at a start of the backup operation;

a second executable portion for, if a first locked record of the plurality of locked records is obtained during the backup operation, adding a first key identifying the first locked record to the list of keys;

a third executable portion for, at a completion of the backup operation, if a second locked record of the plurality of locked records was not moved during the backup operation, dropping a second key identifying the second locked record from the list of keys;

a fourth executable portion for writing the list of keys to a log file as in-flight updates; and a fifth executable portion for reprocessing the in-flight updates through the backup operation using the log file.

16. The computer program product of claim 15, wherein the fifth executable portion for reprocessing the in-flight updates through the backup operation includes a sixth executable portion for processing a group of the plurality of locked records that have become unlocked subsequent to the completion of the backup operation.

17. The computer program product of claim 15, wherein the fifth executable portion for reprocessing the in-flight updates only executes pursuant to a file restoration determination.

18. The computer program product of claim 15, wherein the fourth executable portion for writing the list of keys to a log file includes a sixth executable portion for writing the list of keys to an existing applications log.

19. The computer program product of claim 15, further including a sixth executable portion for creating the log file.

20. The method of claim 1, further including verifying a portion of a data set corresponding to the in-flight updates.

* * * * *